United States Patent [19]

Doughty et al.

[11] Patent Number: 4,781,746

[45] Date of Patent: Nov. 1, 1988

[54] DRIVE APPARATUS FOR STRAIGHT LINE SHEAR MECHANISM

[75] Inventors: Robert L. Doughty, West Hartford; Robert J. Duga, Enfield, both of Conn.

[73] Assignee: Emhart Industries, Inc., Farmington, Conn.

[21] Appl. No.: 134,277

[22] Filed: Dec. 17, 1987

[51] Int. Cl.[4] ............................................. C03B 7/10
[52] U.S. Cl. ....................................... 65/332; 65/334
[58] Field of Search .................. 65/332, 334; 83/623; 92/31

[56] References Cited

U.S. PATENT DOCUMENTS

| | | | |
|---|---|---|---|
| 3,996,037 | 12/1976 | Wythe | 65/334 |
| 4,174,647 | 11/1979 | Dahms | 83/623 X |
| 4,214,494 | 7/1980 | Dahms | 83/623 X |
| 4,215,611 | 8/1980 | Dahms | 83/623 |
| 4,450,741 | 5/1984 | Mumford | 65/334 X |
| 4,500,334 | 2/1985 | Parkell et al. | 65/334 |
| 4,699,643 | 10/1987 | Kulig | 65/332 |
| 4,728,354 | 3/1988 | Vilk et al. | 65/334 |

Primary Examiner—Robert L. Lindsay
Attorney, Agent, or Firm—Arthur B. Moore

[57] ABSTRACT

An improved drive assembly for a straight line shear mechanism or like, reciprocably mounted mechanism of a glassware forming machine wherein the mechanism is coupled by an arm to a drive rod, the improvement lying in the provision of an adaptable joint between the drive rod and the arm. Such joint permits a limited amount of radial repositioning of the arm relative to the drive rod, and a lesser amount of axial repositioning and reorientation. A preferred design of such joint utilizes a hardened sleeve fitted around a segment of the drive rod, such sleeve having a flange to provide a radial surface. A rod nut placed at the other end of the sleeve provides a second radial surface. A bushing secured within an aperture of the arm by a bushing nut is housed around the sleeve between the sleeve flange and the rod nut. Such bushing has an inner diameter which is somewhat greater than the outer diameter of the sleeve to provide a radial clearance region, and its axial length is slightly less than the separation of the sleeve flange and rod nut thereby providing limited axial clearance.

19 Claims, 4 Drawing Sheets

DRIVE APPARATUS FOR STRAIGHT LINE SHEAR MECHANISM

BACKGROUND OF THE IVENTION

The present inventon relates to straight line shear mechanisms and more particularly to an improved drive assembly therefor.

U.S. Pat. No. 4,215,611 discloses an apparatus for straight line shearing of molten glass wherein upper and lower shear blade assemblies are each reciprocably mounted on carriage members, the upper and lower carriage members being driven by a pneumatic cylinder assembly and rack an pinion arrangement. As illustrated in FIGS. 1 and 2 of the U.S. Pat. No. '611, and discussed at column 9, lines 8-66, one of the shear blade carriage arms (or "flange portions") is coupled to a forward portion of the operating rod driven by the pneumatic cylinder assembly, while the other carrige arm is indirectly driven in the opposite direction by means of a parallel rack and pinion linkage between such carriage arm and a rear portion of the operating rod. In both cases, the flange portion, or carriage arm, is secured to the driving rod or rack using washers, lock washer, and a nut member to secure the connection. The carriage arms are in turn connected to the shear blade carriages via tubular portions of the carriages which are slidingly mounted on guide rods, the opposite ends of the carriage being slidingly mounted on a guide rail. Thus, the shear blades are reciprocated between open and shearing positions along an axis parallel to the axes of the guide rods, and ideally, to the axes of the operating rod and racks.

In practice, such straight line shearing mechanisms have sometimes encountered premature wear of parts due to the rigid connection between the drive rod and rack and the shear blade carriages. This rigid connection did not permit compensation for any non-parallelism of the drive rods to the guide rods. Furthermore, in assembling a shear mechanism, it was difficult to assure a proper alignment of the drive rods, carriage arm, and the complex shear blade carriage assemblies, inasmuch as the dimensional tolerances of these interconnected parts were such that misalignment could occur if the parts were not chosen and assembled with great care. This latter problem arose from the intolerance of the rack rodcarriage arm joints to radial misalignment.

Commonly assigned U.S. Pat. No. 4,699,643 discloses various improved drive assemblies for straight line shears, all of which incorporate a drive pinion for reciprocating racks which are secured to the shear blade carriages. Certain disclosed embodiments incorporate a fluidic drive source in combination with an electric servo motor, while the embodiment of FIG. 1 relies upon the servo motor alone to directly drive the pinion gear. All of these embodiments share the feature that the drive rack rods are fixedly mounted to arms extending from the shear blade carriages, and share the shortcomings described above.

Accordingly, it is a principal object of the invention to provide an improved drive assembly for a straight line shear mechanism of the type utilizing reciprocating rods to drive the parallel-mounted carriages housing the shear blade assemblies. In particular, it is desired to avoid premature wear and dimensional tolerance problems encountered in prior art systems of this type.

SUMMARY OF THE INVENTION

In furthering the above and additional objects, the invention provides an improved drive assembly for a reciprocably mounted mechanism in a glassware forming machine, of the type including an arm secured to the mechanism, at least one slidingly mounted drive rod having an axis essentially parallel to an axis of reciprocation of the mechanism, said drive rod being joined to said arm so that the arm and mechanism move in parallel with said drive rod, and drive means for reciprocating said drive rod along its axis; wherein the improvement comprises an improved joint between the arm and the drive rod, comprising first and second annular members projecting from a circumferential member fitted to or integral with said drive rod, said annular members having facing radial surfaces; and a bushing member secured to or integral with said arm and placed around said drive rod intermediate the radial surfaces of said annular members; there being a radial clearance region between the circumferential member and said bushing member to permit limited radial motion of the arm relative to the drive rod, and an axial clearance region between the bushing member and the radial surfaces. This arrangement allows for "float" with low backlash. In a preferred embodiment of the invention, the improved drive assembly of the invention drives the reciprocating motion of a straight line shear mechanism.

In the preferred geometry of the drive assembly of the invention, the drive rod, first and second annular members, and bushing member all are circular in radial cross section. Advantageously, the radial clearance region is on the order of 0.01-0.1 inch in width. In order to permit the sliding of the bushing member relative to the first and second annular members, and a very limited amount of axial reorientation of these structures, these are separated by an axial gap which is preferably an order of 0.001 to 0.003 inches in width.

In a preferred construction of such joint, a hard sleeve is provided for the drive rod which forms the circumference of the rod within the bushing member, such sleeve having a flange which comprises the first annular member. Advantageously, the second annular member comprises a rod nut which is located at the end of the sleeve opposite its flange.

BRIEF DESCRIPTION OF THE DRAWINGS

The above and additional aspects of the invention are illustrated in the following detailed described of a preferred embodiment, which is to be taken together with the drawings in which.

DETAILED DESCRIPTION

Figure 1:
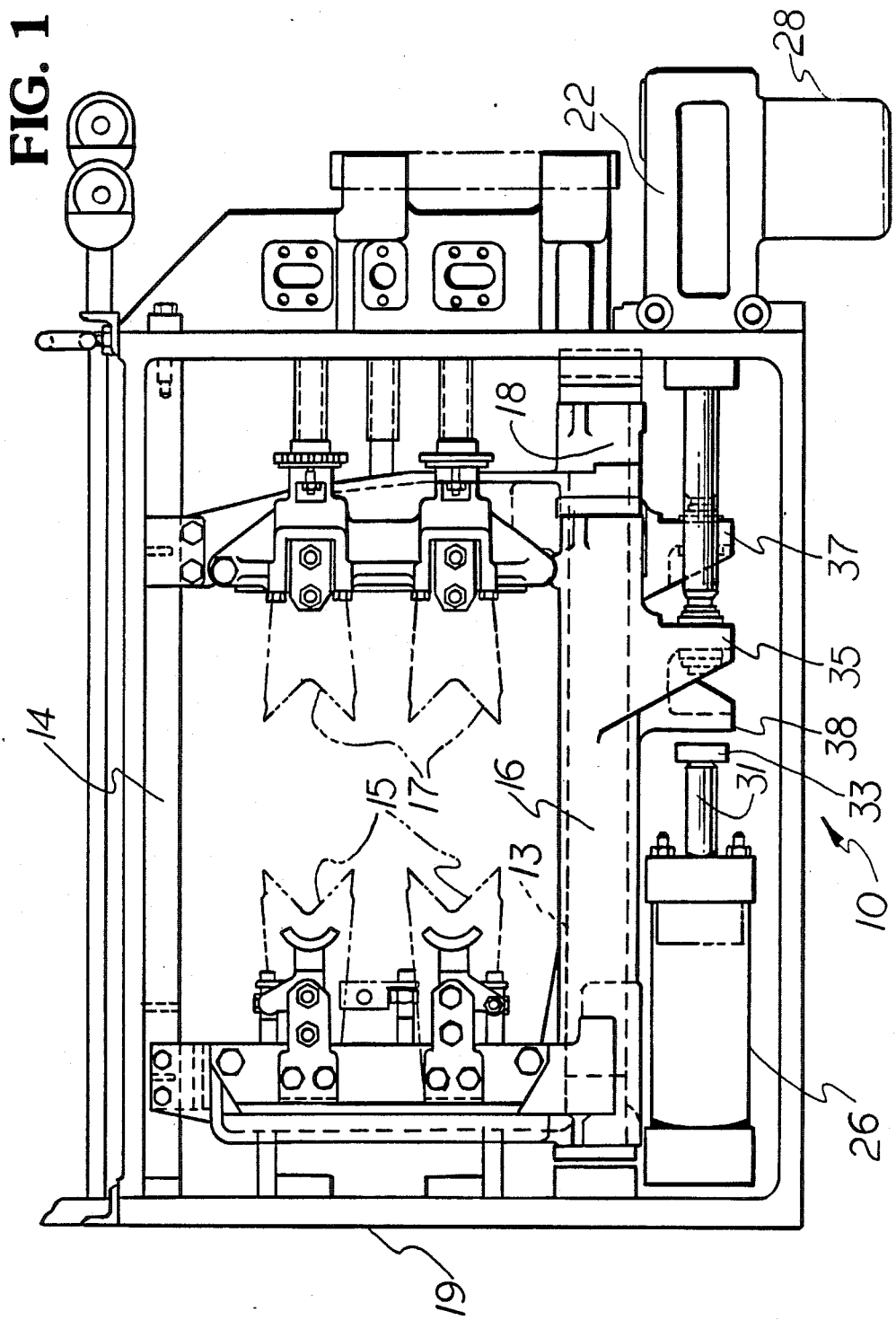
FIG. 1 is a plan view of a shear mechanism incorporating the present invention.

Reference should now be had to FIG. 1 for an overview of a shear mechanism embodying an improved drive assembly according to the present invention. The shear mechanism is generally of the design disclosed in commonly assigned U.S. Pat. No. 4,215,611, which discloses a straight line shearing mechanism utilizing a pneumatic drive system to cause the operation of the shears, but includes certain modifications to adapt shear mechanism 10 to a servo motor drive, in accordance with commonly assigned U.S. Pat. No. 4,699,643 (FIG. 1). The disclosure of these patents is incorporated herein by reference. The following differences should be noted between the shear mechanism 10 and that of the U.S. Pat. No. '611. The shear mechanism 10 is driven by servo motor 28, rather than a pneumatic drive source as in the U.S. Pat. No. '611. As further noted with reference to the sectional view of FIG. 2, the air cylinder 26 seen at the lower left in FIG. 1 does not serve as a drive source, but rather to separate the shears for safety purposes in the event of an electrical malfunction. There is a substantially different configuration of drive rods and racks as will be further explained below with reference to FIG. 2. In general, as seen in the plan view of FIG. 1, upper and lower shear assemblies 15 and 17, respectively, are reciprocably mounted. The upper shear assembly 15 has a tubular portion 16 which slides on a guide rail 13 seen in phantom; shear assembly 15 also slides on guide rail 14. Lower shear assembly 17 has a tubular portion 18 (only partially visible in FIG. 1) which slides on a guide rail not visible in this view, and lower shear assembly 17 also slides on guide rail 14. The tubular portion 16 of upper shear assembly 15 has a flange portion or arm 35 which links the shear assembly to a drive rod 20 which is driven from servomotor 28 as explained below with reference to FIG. 2. The tubular portion 18 of lower shear assembly 7 also has a double flange portion, comprising opposing arms 37, 38. Arm 37 is linked to a drive rod 24 (seen in phantom in FIG. 1) driven by servomotor 28, while arm 38 is aligned with but not linked to a piston rod 31 from air cylinder 26, as further explained below. The main frame 19 of shear mechanism 10 is an integrally formed structure, which has advantages noted below. It should be noted that the guide rails 13 and 14 and the drive rods 20, 24 ideally are parallel to each other.

Figure 2:
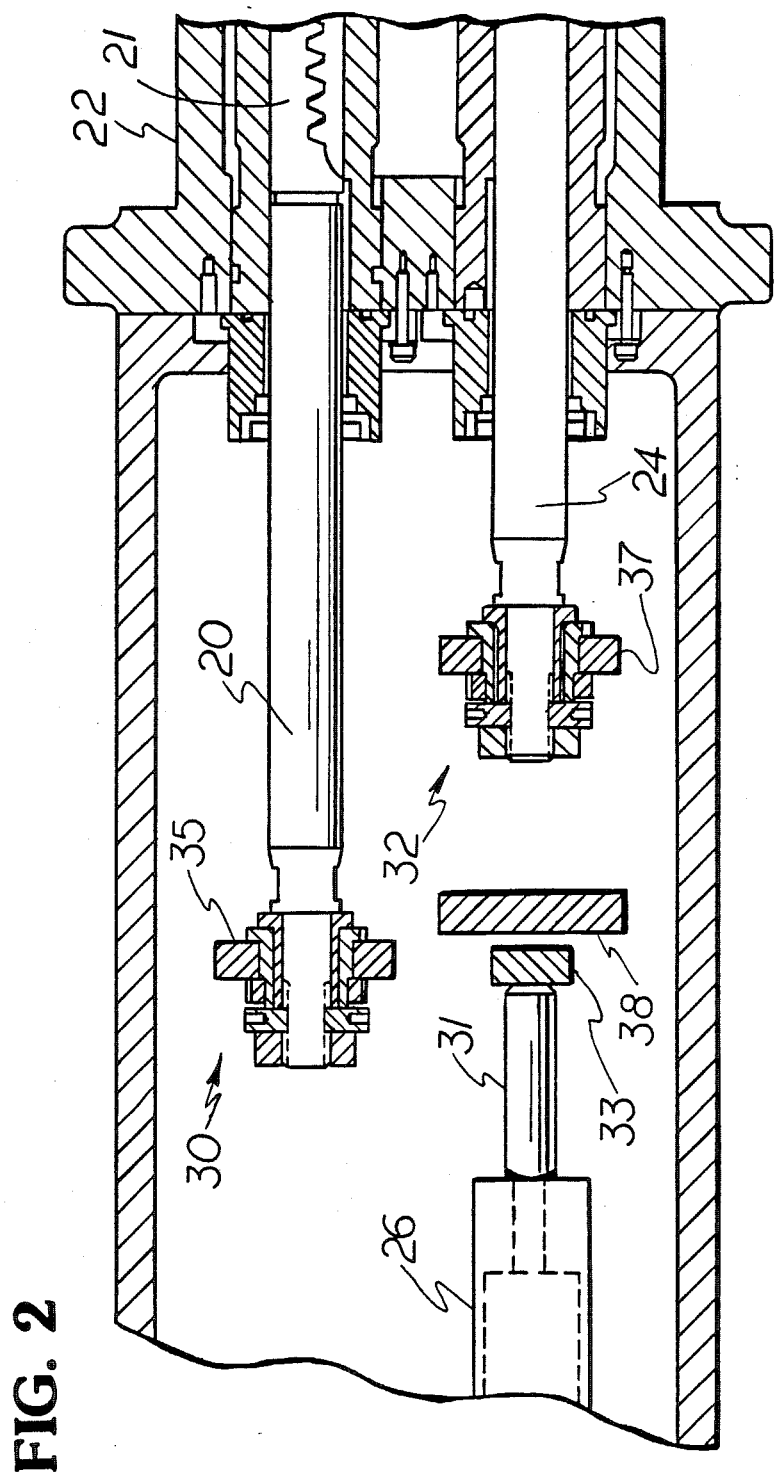
FIG. 2 is a sectional view of a servo motordrive straight line shear drive assembly from the shear mechanism of FIG. 1.

Now having reference to the sectional view of FIG. 2, the drive structures of the shear assembly 10 include a pair of upper and lower rack rods 20 and 24 with respective rack portions the upper one of which is seen at 21. The rack portions are geared to a pinion gear within housing 22, such pinion gear being directly coupled to the shaft of the servo motor 28 to be rotated thereby. The rack rods 20 and 24 are respectively coupled to the arms 35 and 37 by adaptable joints 30 and 32 in accordance with the present invention, the detailed design of which will be discussed below. In general terms, adaptable joints 30 and 32 permit a certain amount of radial repositioning of the arms 35 and 37 relative to the axes of rods 20 and 24, and additionally a lesser degree of axial displacement and axial skew.

As best seen in FIG. 2, the piston rod 31 extending from air cylinder 26 has at its end nearest arm 38 a bumper 33. Air cylinder 26 is actuated in the event of an electrical malfunction of the shear mechanism 10 to drive the bumper 33 against the arm 38 and thereby move the lower shear assembly 17 out from its central, shearing position.

In an alternative embodiment of the invention, not illustrated in the present drawings, adaptable joints such as those shown at 30 and 32 in FIG. 2 are incorporated in a pneumatically driven shear mechanism such as that shown in commonly assigned U.S. Pat. No. 4,215,611. In this embodiment, the drive source is an air cylinder-piston assembly rather than a servo-motor, and the piston rod-arm linkage is an adjustable joint rather than a fixed joint.

Figure 3:
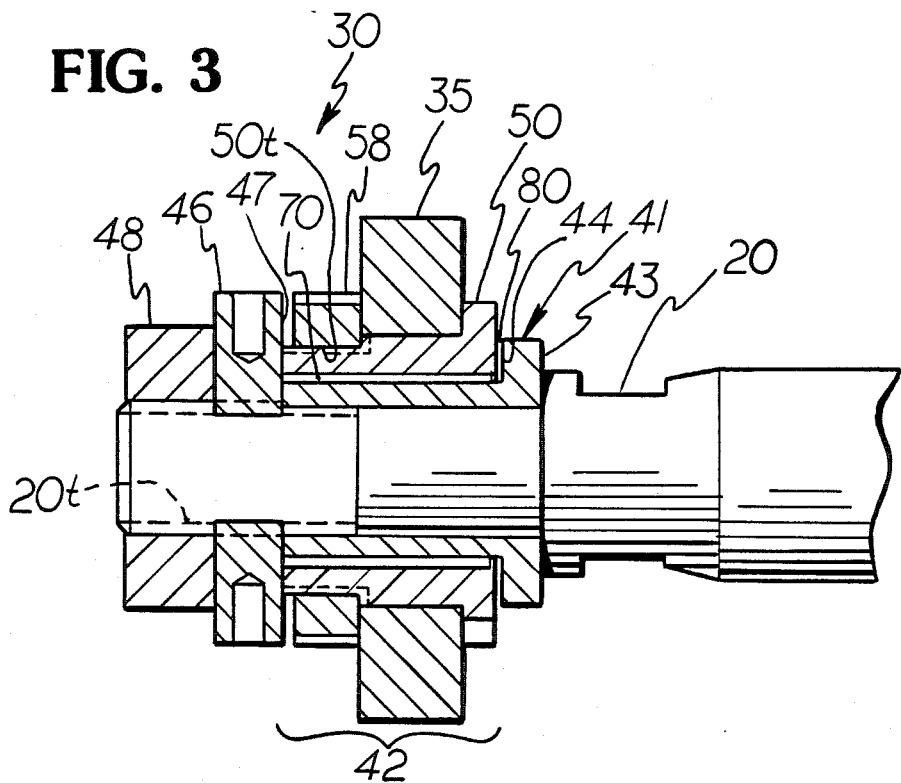
FIG. 3 is a sectional view of a single adaptable joint corresponding to the section of FIG. 2.
Figure 4:
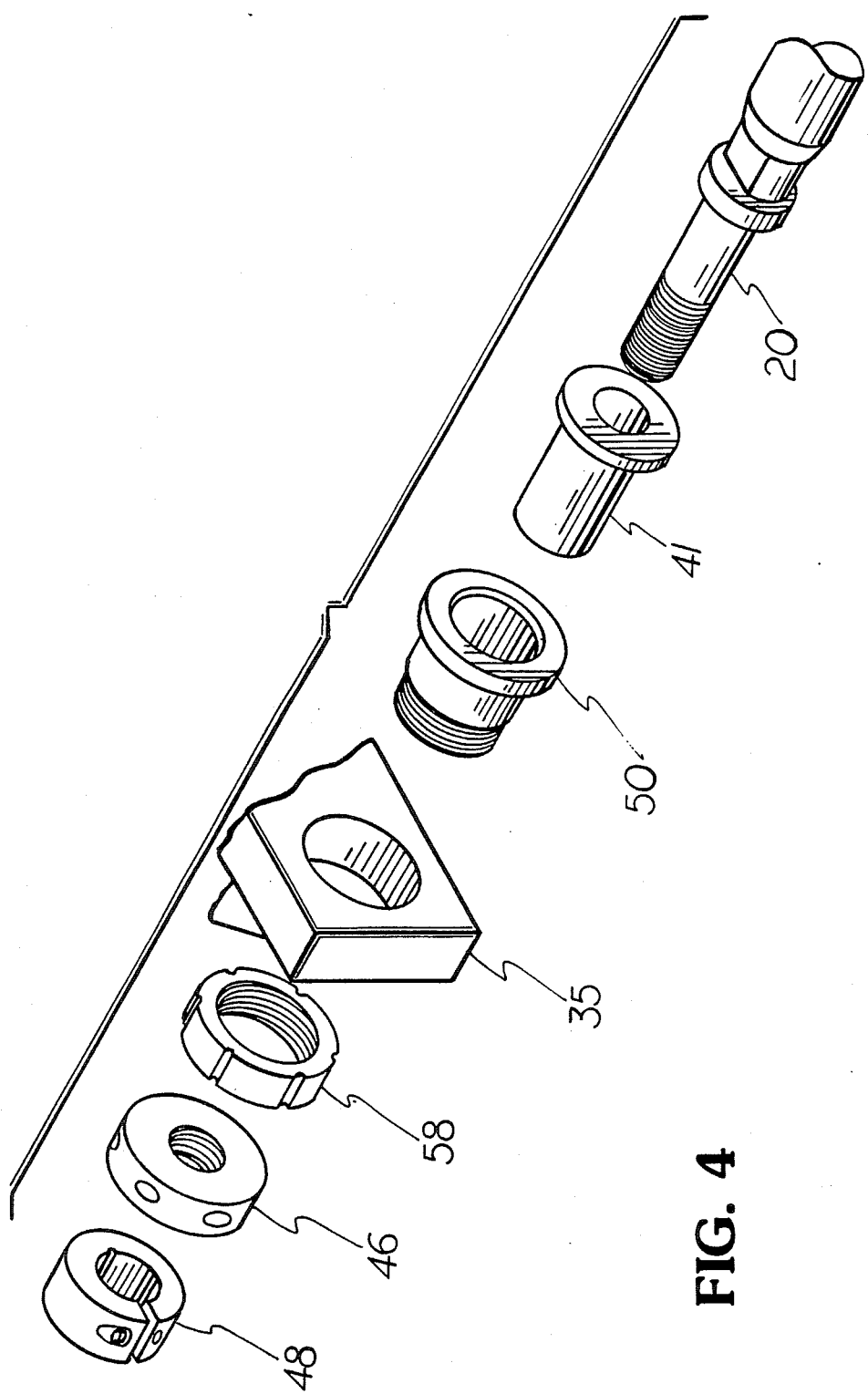
FIG. 4 is a perspective view of the joint of FIG. 3, with its various parts shown separated for greater clarity.

Reference should now be had to FIG. 3 which shows one of the adaptable joints 30 in the sectional view of FIG. 2, in expanded scale, together with the perspective view of FIG. 4 which shows the parts comprising joint 30 separated from each other. Rack rod 20 has a hardened sleeve 41 fitted near the end of the rod, and includes a threaded portion 20t at the rod end. Hardened sleeve 41 includes a flange portion 43 at its inner end, and a rod nut 46 is threaded onto rod end 20T at the other end of sleeve 41. A radial surface 44 of sleeve flange 43 and radial surface 47 of rod nut 46 define between them a circumferential region 42 around the hardened sleeve 41. Split collar 48 retains rod nut 46 at the end of the rack rod 20.

Region 42 contains bushing 50, bushing nut 58, and arm 35, which form an integral structure wherein the bushing 50 is secured within a cylindrical aperture of arm 35 by bushing nut 58, which is threaded onto a threaded surface 50t of bushing 50.

The outer diameter of the body of sleeve 41 is less than the inner diameter of bushing 50 to provide a radial clearance region 70 between these structures. Advantageously, a gap on the order of 0.01–0.1 inch is provided between these structures. Furthermore, the axial length of bushing 50 is about 0.001 to 0.003 inches less than the separation of radial surfaces 44 and 47, so as to provide an axial clearance region 80. The effect of this is to permit radial repositioning of the arm 35 relative to the drive rod 20, and to a lesser extent, to permit relative axial displacement or axial skew of arm 35 relative to rod 20. Referring again to the plan view of FIG. 1 and sectional view of FIG. 2, joints 30 and 32 permit radial repositioning and axial reorientation of arms 35 and 37 relative to drive rods 20 and 22, and thereby prevent premature wear of the moving parts of shear mechanism 10 due to side loading from non-parallelism of the guide rails to the drive rods. Furthermore, by permitting a radial repositioning of the shear assemblies 15 and 17 and their inter-connected structures relative to the drive rods 20 and 24, the shear mechanism 10 is able to adapt to variations within dimensional tolerances of the various structures of the shear mechanism drive.

The use of an integrally formed frame 19 contributes to these advantages by providing a more secure mounting structure for the moving parts of shear mechanism 10.

Figure 5:
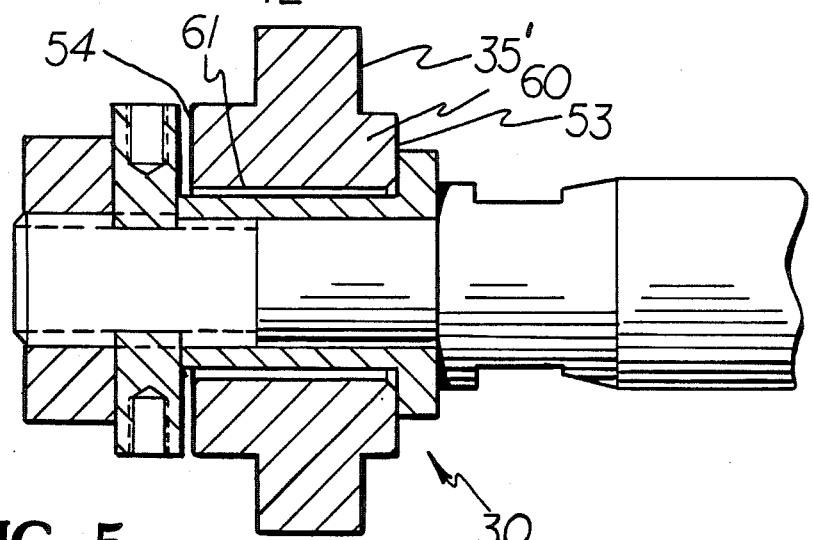
FIG. 5 is a sectional view of an adaptable joint in accordance with an alternative embodiment of the invention, in a section corresponding to that of FIG. 3.

FIG. 5 shows in section an alternative design of a flexible joint 30' generally similar to the joint 30 shown in FIG. 3, with the difference that in lieu of a separate bushing 50 and bushing nut 58 secured to arm 35, the arm 35' of FIG. 5 includes a cylindrical rim 60 having similar dimensions to those of bushing 50. That is, the length of rim 60 between its end surfaces 53, 54 and its inner diameter at surface 61 is comparable to the length and inner diameter of bushing 50.

I claim:
1. An improved drive assembly for a reciprocally mounted mechanism of a glassware forming machine, of the type including an arm secured to the mechanism, at least one slidingly mounted drive rod having an axis essentially parallel to an axis of reciprocation of the mechanism, said drive rod being joined to said arm so that the arm and mechanism move in parallel with said drive rod, and drive means for reciprocating said drive rod along its axis; wherein the improvement comprises an improved joint between the arm and the drive rod, comprising:

first and second annular members projecting from a circumferential member fitted to or integral with said drive rod, said annular members having radial surfaces facing each other; and a bushing member secured to or integral with said arm and fitted around said drive rod intermediate the radial surfaces of said annular members, with a radial clearance region between said circumferential member and said bushing member and an axial clearance region between the bushing member and the radial surfaces to permit limited repositioning and reorientation of the arm relative to the drive rod.

2. An improved drive assembly as defined in claim 1 wherein the drive rod, first and second annular members, and bushing member are circular in radial cross-section.

3. An improved drive assembly as defined in claim 1 wherein the circumferential member comprises a hard sleeve for the drive rod, said sleeve having a flange which comprises the first annular member.

4. An improved drive assembly as defined in claim 3 wherein the second annular member comprises a nut located at an end of the sleeve opposite the flange.

5. The improved drive assembly of claim 1 wherein the circumferential member comprises a portion of the drive rod.

6. An improved drive assembly as defined in claim 1 wherein the bushing member comprises a separate structure secured within an aperture of the arm.

7. An improved drive assembly as defined in claim 1 wherein the bushing member is integral with the arm.

8. An improved drive assembly as defined in claim 2 wherein the radial clearance region is on the order of 0.01–0.1 inch in width.

9. An improved drive assembly as defined in claim 1 wherein the width of the axial clearance region is in the range 0.001 to 0.003 inch.

10. An improved drive assembly for a shear mechanism of a glassware forming machine, of the type including an arm secured to the shear mechanism, at least one slidingly mounted drive rod having an axis essentially parallel to an axis of reciprocation of the shear mechanism, said drive rod being joined to said arm so that the arm and shear mechanism move in parallel with said drive rod, and drive means for reciprocating said drive rod along its axis; wherein the improvement comprises an improved joint between the arm and the drive rod, comprising:

first and second annular members projecting from a circumferential member fitted to or integral with said drive rod, said annular members having radial surfaces facing each other; and a bushing member secured to or integral with said arm and fitted around said drive rod intermediate the radial surfaces of said annular members, with a radial clearance region between said circumferential member and said bushing member and an axial clearance region between the bushing member and the radial surfaces to permit limited repositioning and reorientation of the arm relative to the drive rod.

11. An improved drive assembly as defined in claim 10 wherein the drive rod, first and second annular members, and bushing member are circular in radial cross-section.

12. An improved drive assembly as defined in claim 10 further wherein said circumferential member comprises a hard sleeve for the drive rod, said sleeve having a flange which comprises the first annular member.

13. An improved drive assembly as defined in claim 10 wherein the second annular member comprises a nut located at an end of the sleeve opposite the flange.

14. An improved drive assembly as defined in claim 10 wherein the circumferential member comprises a portion of the drive rod.

15. An improved drive assembly as defined in claim 10 wherein the bushing member comprises a separate structure secured within an aperture of the arm.

16. An improved drive assembly as defined in claim 10 wherein the bushing member is integral with the arm.

17. An improved drive assembly as defined in claim 10 wherein the annular clearance region is on the order of 0.01–0.1 inch in width.

18. An improved drive assembly as defined in claim 10 wherein the width of the axial clearance region is in the range 0.001 to 0.003 inch.

19. An improved drive assembly as defined in claim 10 including a pair of parallel drive rods each including rack portions, said drive means comprising a pinion gear geared to the drive rod racks, and a motor for turning the pinion gear.

* * * * *